US011275189B2

(12) United States Patent
Padhi et al.

(10) Patent No.: US 11,275,189 B2
(45) Date of Patent: Mar. 15, 2022

(54) SIMULATION OF GEOPHONE DATA FROM DISTRIBUTED ACOUSTIC SENSING DATA (71) Applicant: Halliburton Energy Services, Inc., Houston, TX (US)

(72) Inventors: Amit Padhi, Houston, TX (US); Mark Elliott Willis, Katy, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/741,389

(22) PCT Filed: Dec. 2, 2016

(86) PCT No.: PCT/US2016/064739
§ 371 (c)(1),
(2) Date: Jan. 2, 2018

(87) PCT Pub. No.: WO2018/101965
PCT Pub. Date: Jun. 7, 2018

(65) Prior Publication Data
US 2020/0081145 A1   Mar. 12, 2020

(51) Int. Cl.
*G01V 1/20* (2006.01)
*G01V 1/22* (2006.01)
(Continued)

(52) U.S. Cl.
CPC .............. *G01V 1/208* (2013.01); *G01V 1/226* (2013.01); *G01V 1/46* (2013.01); *G01V 1/50* (2013.01);
(Continued)

(58) Field of Classification Search
CPC .......... G01V 1/208; G01V 1/226; G01V 1/46; G01V 1/50; G01V 2210/1299; G01V 2210/1429; G01V 2210/161
See application file for complete search history.

(56) References Cited

U.S. PATENT DOCUMENTS 6,072,567 A    6/2000   Sapack
8,972,059 B2 * 3/2015   Moriyama ............. B25J 9/1633
                                                   700/258
(Continued)

FOREIGN PATENT DOCUMENTS

JP         3802478 B2 *   7/2006
WO    WO 2016/112147 A1   7/2016

OTHER PUBLICATIONS

T.M. Daley and et al, "Field testing of modular borehole monitoring with simultaneous distributed acoustic sensing and geophone vertical seismic profiles at Citronelle, Alabama", Geophysical Prospecting, Sep. 1, 2016, 64, 1318-1334 (Year: 2016).*

(Continued)

*Primary Examiner* — Douglas Kay
(74) *Attorney, Agent, or Firm* — Haynes and Boone, LLP (57) ABSTRACT Various embodiments include apparatus and methods implemented to simulate geophone data from distributed acoustic sensing data, such as simulating vertical component geophone waveform data from distributed acoustic sensing data. Embodiments include measuring vertical component of strain at a plurality of vertical positions along an optical fiber disposed along a wellbore at a well site. The measured vertical component of strain can be processed to generate a vertical component of displacement. The vertical component of displacement can be used to generate a vertical component of velocity from which a waveform simulating a waveform of geophone data can be output. Additional apparatus, systems, and methods are disclosed.

20 Claims, 8 Drawing Sheets (51) Int. Cl.
 *G01V 1/46* (2006.01)
 *G01V 1/50* (2006.01)
(52) U.S. Cl.
 CPC ............... *G01V 2210/1299* (2013.01); *G01V 2210/1429* (2013.01); *G01V 2210/161* (2013.01)

(56) References Cited

U.S. PATENT DOCUMENTS

| | | | | |
|---|---|---|---|---|
| 10,028,089 | B2* | 7/2018 | Na | G01S 5/0249 |
| 2010/0332032 | A1* | 12/2010 | Moriyama | B25J 9/1682 |
| | | | | 700/258 |
| 2014/0301165 | A1* | 10/2014 | Nichols | G01V 1/303 |
| | | | | 367/52 |
| 2015/0014521 | A1 | 1/2015 | Barfoot | |
| 2015/0233236 | A1 | 8/2015 | Johnston | |
| 2016/0146661 | A1* | 5/2016 | Martin | G01V 1/52 |
| | | | | 356/482 |
| 2017/0195834 | A1* | 7/2017 | Na | G01S 5/12 |

OTHER PUBLICATIONS

F. Poletto and et al, "Dual seismic fields from distributed acoustic sensors", SEG Denver 2014 Annual Meeting, DOI http://dx.doi.org/10.1190/segam2014-1055.1 (Year: 2014).*

Daley et al., "Results of Field Testing of Simultaneous DAS and Geophone VSP," *76th EAGE Conference and Exhibition—Workshops*, Jun. 16-19, 2014, Amsterdam RAI, The Netherlands.

International Search Report and The Written Opinion of the International Search Authority, or the Declaration, dated Apr. 20, 2016, PCT/US2015/043870, 17 pages, ISA/KR.

* cited by examiner

SIMULATION OF GEOPHONE DATA FROM DISTRIBUTED ACOUSTIC SENSING DATA

CROSS-REFERENCE TO RELATED APPLICATION

The present application is a U.S. National Stage patent application of International Patent Application No. PCT/US2016/064739, filed on Dec. 2, 2016, the benefit of which is claimed and the disclosure of which is incorporated herein by reference in its entirety.

TECHNICAL FIELD

The present invention relates generally to apparatus and methods with respect to measurements related to oil and gas exploration.

BACKGROUND

Distributed acoustic sensing (DAS) technology is being implemented for vertical seismic profiling (VSP). Such technology is being developed for permanently installed reservoir monitoring, as well as for temporal deployment in wellbores. Conventional VSP technology has used a seismic source at the surface near a well and geophones within the wellbore to make seismic measurements, which can be correlated with surface seismic data. In the conventional VSP approach, reflected energy contained in a recorded trace at each geophone position can be used to obtain an image. DAS can utilize a fiber optic cable deployed in a wellbore that can be remotely interrogated with one or multiple surface-based lasers. Rayleigh scattering from random heterogeneities in the optical fiber of the cable is the primary mechanism of back propagation of laser beams for interrogation, where the optical fiber is an optical waveguide. Phase difference of the demodulated back-scattered light is introduced when the optical fiber is deformed by impinging seismic waves. Processing the time-of-flight of laser pulses enables the optical fiber to attain fine channel spacing of typically 1 meter, which is equivalent to a VSP receiver level. Thus, the density of samples significantly increases compared to that of conventional VSP, with data acquisition rates often as high as 16 kHz for simplified acquisition hardware.

DETAILED DESCRIPTION

The following detailed description refers to the accompanying drawings that show, by way of illustration and not limitation, various embodiments in which the invention may be practiced. These embodiments are described in sufficient detail to enable those skilled in the art to practice these and other embodiments. Other embodiments may be utilized, and structural, logical, electrical, and mechanical changes may be made to these embodiments. The various embodiments are not necessarily mutually exclusive, as some embodiments can be combined with one or more other embodiments to form new embodiments. The following detailed description is, therefore, not to be taken in a limiting sense.

In various embodiments, vertical component geophone seismic waveform data can be simulated using waveform data collected by optical fibers of a distributed acoustic sensing (DAS) arrangement. Given that the DAS data has passed through various processing steps to simulate point-like receivers, which can be performed by conventional techniques, the processed DAS data can be used as an input to a simulation process to simulate geophone data. Such a simulation of geophone data may be helpful in further processing and interpretation, since various methods that operate on processed measurement data in traditional geophysical workflows have already been established for geophone data instead of DAS waveform data.

Conventional VSP surveys use hydrophones or geophones deployed in a wellbore, sensing, by detecting and recording, acoustic wavefields generated from near surface sources. The surface sources may include, for example, vibrators, explosives, air guns, and other similar sources. While geophones provide one-dimensional (1D) sensitivity, they can be configured in pairs or triads for two-dimensional (2D) and three-dimensional (3D) sensitivity. DAS VSP surveys replace the hydrophones or geophones with a fiber optic cable that can be remotely interrogated with a surface-based laser. Rayleigh scattering from random heterogeneities in the optical fiber (optical waveguide) occurs when the optical fiber (optical waveguide) is deformed by mechanical/seismic waves induced by vibrations. Time-of-flight of laser pulses enable the time resolution of raw recorded data stream as high as 20 kHz. The spatial resolution, confined by pulse width of lasers and gauge length, can be attained at a channel spacing of typically 1 meter, equivalent to a VSP receiver level. The gauge length is a base length for measurement.

Figure 1A:
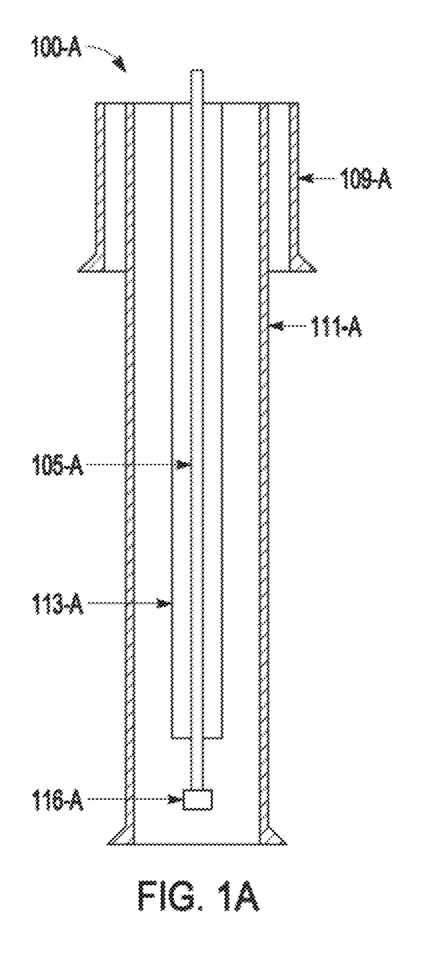
FIGS. 1A-1C are schematic representations of examples of fiber optic-based distributed acoustic sensing deployed in a wellbore, in accordance with various embodiments.
Figure 1B:
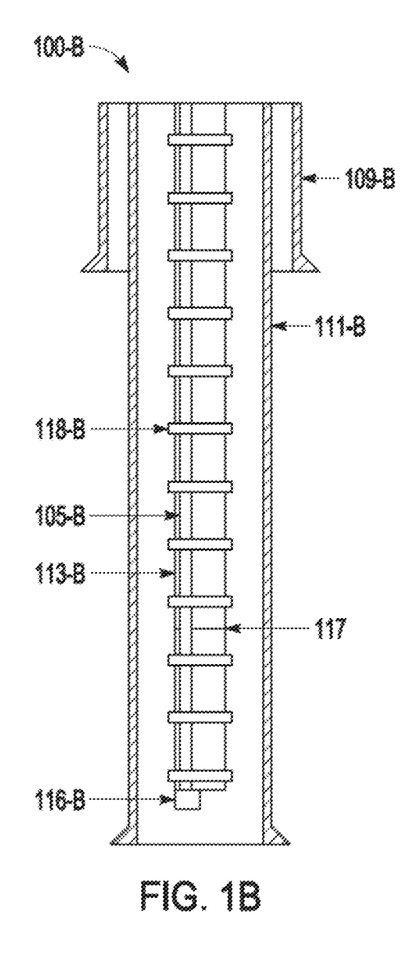
Figure 1C:
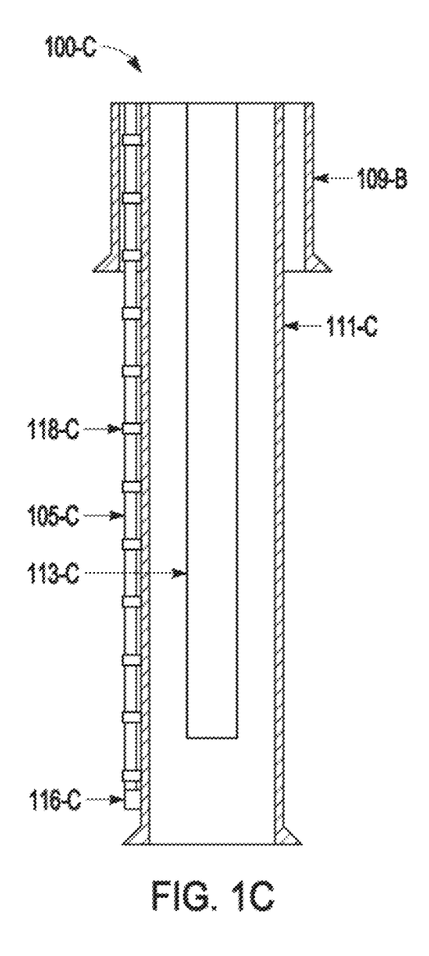

During hydrocarbon recovery operations, including well drilling, it is common to use DAS systems to collect VSP data along the length of a wellbore. FIGS. 1A-1C are schematic representations of examples of fiber optic-based DAS deployed in a wellbore. Wireline arrangements, or other conventional techniques such as slickline arrangements, coiled tubing arrangements, drill pipe arrangements, downhole tractor arrangements, or other appropriate arrangements can be used to deploy the optical fiber of the DAS system. FIG. 1A shows a wireline deployment 100-A that is a retrievable deployment. For wireline deployment, the sensor cable is actively deployed and retrieved, which deployment and retrieval may interrupt production while minimal interruption is preferred from an operational perspective. The wireline deployment 100-A may include a fiber optic cable 105-A within a tubing 113-A that can be within a production casing 111-A that can be within a surface casing 109-A. A bottom hole gauge carrier with a pressure and/or temperature (PT) gauge 116-A may be coupled to an end of the fiber optic cable 105-A.

FIG. 1B shows a tubing deployment 100-B that is a permanent deployment. The tubing deployment 100-B may include a fiber optic cable 105-B coupled to the outside of a tubing 113-B. A set of cross-coupling protectors 118-B can be used in coupling the fiber optic cable 105-B to the outside of the tubing 113-B. The set of cross-coupling protectors 118-B may include one of the cross-coupling protectors at every other joint of the tubing 113-B. The tubing 113-B can be within a production casing 111-B that can be within a surface casing 109-B. A tubing tail of the tubing 113-B can be extended below a bottom perforation location 117 in the wellbore. A bottom hole gauge carrier with a pressure and/or temperature (PT) gauge 116-B may be coupled to an end of the fiber optic cable 105-B.

FIG. 1C shows a casing deployment 100-C that is a permanent deployment. The casing deployment 100-C can include a fiber optic cable 105-C coupled to the outside of a production casing 111-C. A set of cross-coupling protectors 118-C can be used in coupling the fiber optic cable 105-C to the outside of the production casing 111-C. The set of cross-coupling protectors 118-C may include one of the cross-coupling protectors at every other joint of the production casing 111-C. A tubing 113-C can be disposed within the production casing 111-C that can be within a surface casing 109-C. A bottom hole gauge carrier with a pressure and/or temperature (PT) gauge 116-C can be coupled to an end of the fiber optic cable 105-C.

A laser generator with a certain frequency or multiple laser generators with preset frequencies intermittently emit light pulses, and an interrogator together with the laser generators record the back-scattered light. Gauge length can be applied during acquisition in a contemporary DAS system. In current scheme of DAS acquisition, the recorded DAS VSP data for each sweep is encoded by predetermined gauge lengths.

A DAS VSP seismic image is normally composed of n recorded traces and m time samples per trace. Different from conventional measurements, DAS measures strain (strain rate) of an optical fiber in response to impinging seismic waves. Strain is defined for certain length of fiber, thus it is different from a point measurement in nature. Such preset length is referred to as gauge length. It basically performs a spatial stacking to the raw continuous data stream (up to 10 kHz), or a boxcar filtering. Receiver levels are then defined at the center of the fiber section spanned gauge length, with designated channel spacing. The setup of the DAS system is illustrated in FIG. 2 where the above definitions are graphically annotated.

Figure 2:
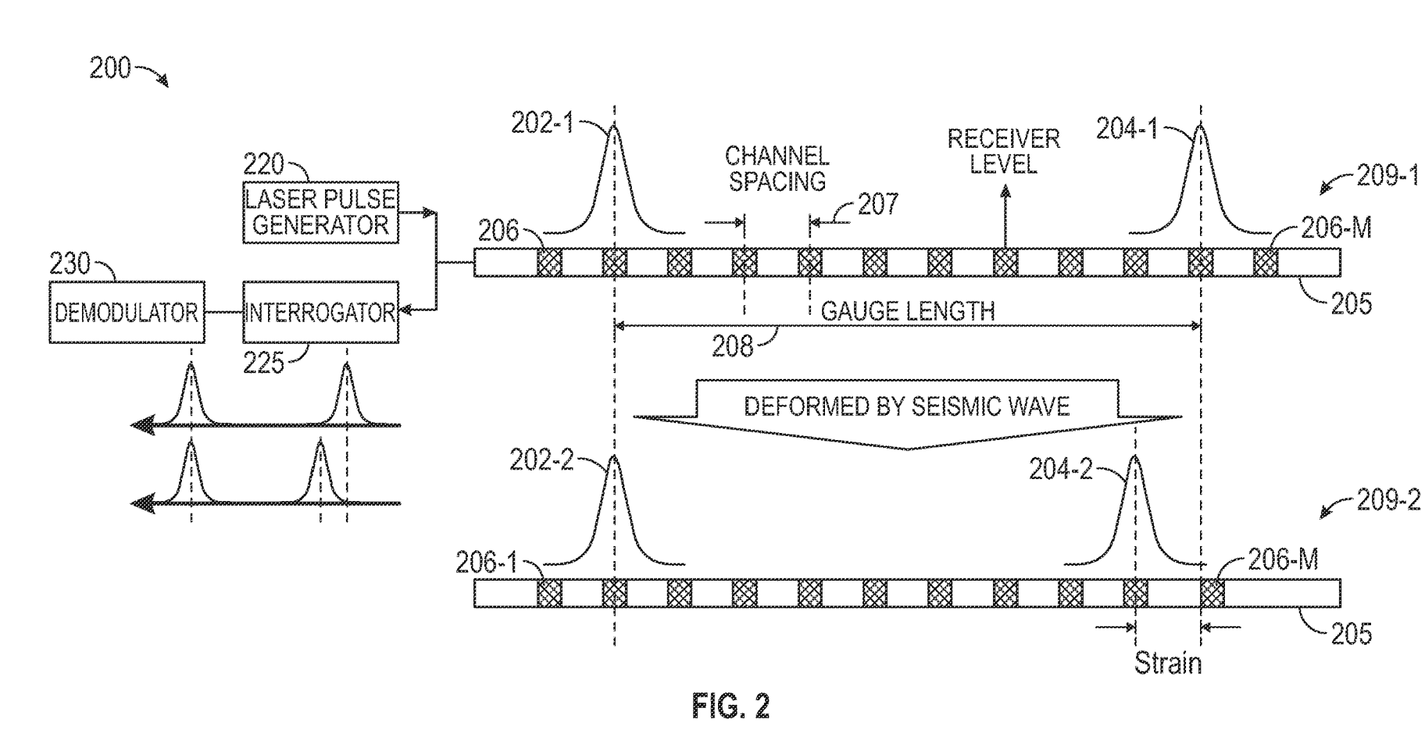
FIG. 2 is a schematic illustration of an example distributed acoustic sensing acquisition system, in accordance with various embodiments.

FIG. 2 is a schematic illustration of an example DAS acquisition system 200. The DAS acquisition system 200 includes an optical fiber 205 with a series of receiver levels 206-1 ... 206-M of which the adjacent spacing is referred to as channel spacing 207. The two waveforms 202-1 and 204-1 are laser pulses, which can be separated by the spacing of gauge length 208. Arrangement 209-1 is the optical fiber 205 prior to being deformed by impinging seismic waves, while arrangement 209-2 is the optical fiber 205 with the receiver levels 206-1 ... 206-M and waveforms 202-2 and 204-2 when the optical fiber 205 is deformed by impinging seismic waves. The DAS acquisition system 200 includes a laser pulse generator 220 that emits laser pulses, and an interrogator 225 that receives the pulse trains. A demodulator 230 may be used with the interrogator 225 for splitting the beam and computing the phase difference between laser pulses. As shown in FIG. 2, the optical fiber 205 is subjected to a pre-determined gauge length l during the acquisition or in the preprocessing flow. DAS VSP wavefields can be herein denoted as $D_l(t,z) \in R^{m \times n}$ where t and z are temporal and spatial variable, respectively. "l" is the gauge length, D is DAS wavefield and "m" and "n" are dimensions of D since it is a 2-D matrix.

A DAS system responds to strain on the optical fiber of the system, and hence the strain in the neighborhood of the optical fiber. In the case of a vertical well with the optical fiber along the well trajectory, the vertical component of strain $$\left(\frac{\partial u_z}{\partial z}\right)$$

is obtained after converting the directly measured quantity to strain using an appropriate transform. On the other hand, a vertical geophone in a vertical well measures the vertical component of the velocity $$\left(\frac{\partial u_z}{\partial t}\right)$$

of the particles in the neighborhood of the geophone. Here $u_z$ is the vertical component of the particle displacement. Hence, equations (1) and (2) below are representative of the data measured by DAS and vertical component geophone in a vertical well, respectively. The sign in equation (1) depends on downgoing or upgoing wavefields being considered because of the well-known issue of polarity difference between data collected using DAS and geophones.

$$S_{DAS}(t, z) = (+/-)\frac{\partial u_z(t, z)}{\partial z} \quad (1)$$

$$S_{geo}(t, z) = \frac{\partial u_z(t, z)}{\partial t} \quad (2)$$

The total wavefield data that is collected using DAS optical fibers or geophones consists of downgoing and upgoing wavefields and hence equation (1) must be correspondingly written and applied to the separated wavefields to consider the total wavefield data. To separate the total collected wavefield data into downgoing and upgoing components, a frequency-wavenumber domain filtering method can be used, where frequency-wavenumber domain filtering is a standard wavefield separation technique used in seismic processing. Equations (1) and (2) can be written as difference equations (3) and (4), respectively, with i and j being indices of discrete time and depths respectively for a downgoing wavefield as:

$$S_{DAS}^{Down}(t, j) = \frac{u_z(t, j+1) - u_z^{Down}(t, j)}{\Delta z} \quad (3)$$

-continued $$S_{geo}(i, z) = \frac{u_z(i+1, z) - u_z(i, z)}{\Delta t} \quad (4)$$

Equations (1) and (2) can be written as difference equations (5) and (6), respectively, with i and j being indices of discrete time and depths respectively for an upgoing wavefield as:

$$S_{DAS}^{Up}(t, j) = \frac{u_z(t, j+1) - u_z^{Up}(t, j)}{\Delta z} \quad (5)$$

$$S_{geo}(i, z) = \frac{u_z(i+1, z) - u_z(i, z)}{\Delta t} \quad (6)$$

Assuming $u_z$ to be zero at t=0 and also before the domain of integration in depth z, a $u_z$ field can be computed from equation (3) using a rearrangement as in equation (7) to perform an integration over depth:

$$u_z(t,j+1) = S_{DAS}(t,j) * \Delta z + u_z(t,j) \quad (7)$$

Similarly, equation (5) can be rearranged as equation (8) to perform an integration over depth $$u_z(t,j+1) = -S_{DAS}(t,j) * \Delta z + u_z(t,j) \quad (8)$$

Next, this $u_z$ field can be used to compute simulated geophone data by performing a derivative over time, using equation (4) for the downgoing wavefield and using equation (6) for the upgoing wavefield at the depths z. Here field refers to the field of the physical quantity as generally defined in physics. The equations (4) and (6) are the same, but written separately for clarity on the set of equations used to process down and up going wavefields, respectively. It should however be kept in mind that smaller time and depth steps would produce more accurate answers. Additionally, it may be noted that it may be necessary to apply a band pass frequency domain filter to each trace of $u_z$ field before application of equation (4). This application of such a filter is performed in the case of a DAS gather at a real survey field location, where noise appears at some higher frequencies in the $u_z$ field as equations (7) and (8) are applied. After generating the downgoing and upgoing simulated geophone data, they can be added to generate a total simulated geophone wavefield data as indicated in FIG. 3B.

The above description implements the transformation of the strain data to simulate geophone data as basically a two-step process: first an integration over depth, z, is performed, followed by a derivative over time. However, using first principles of mathematics, these operations can be switched in order giving an equivalent implementation wherein first the derivative over time is performed, followed by the integration over depth.

Figure 3A:
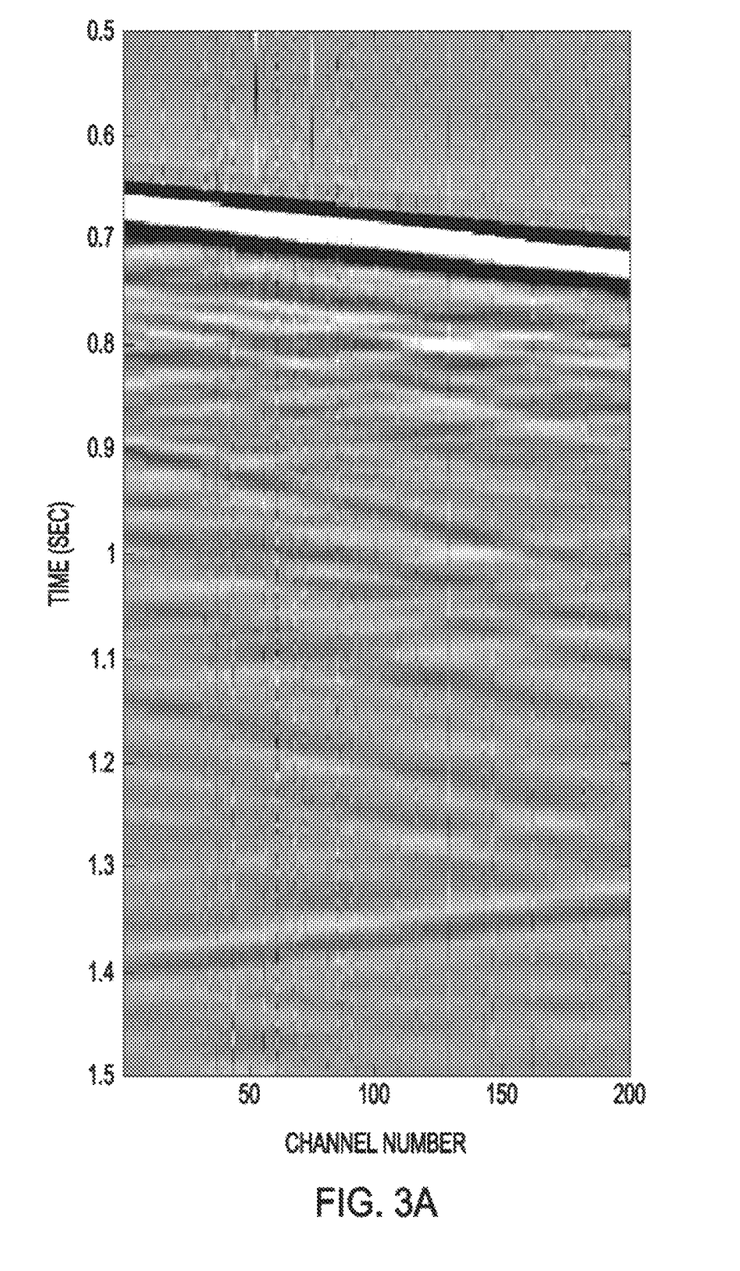
FIGS. 3A-3B provide a comparison of a shot gather and the corresponding simulated geophone data, in accordance with various embodiments.
Figure 3B:
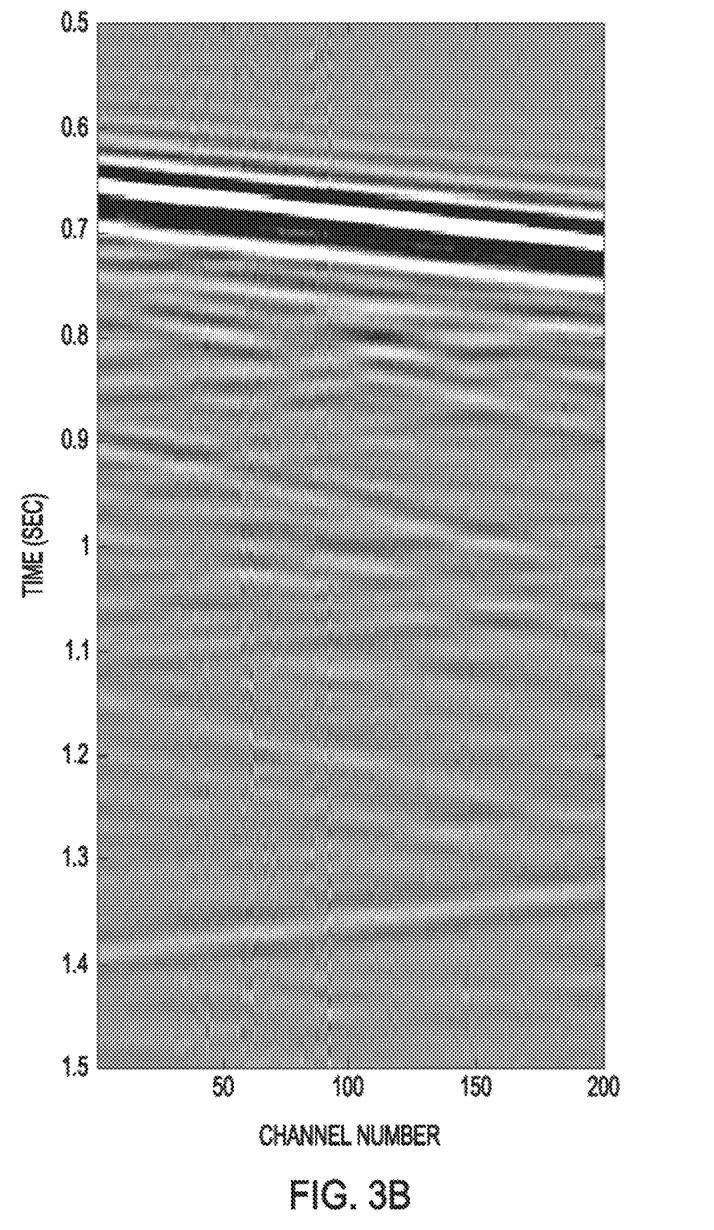

Use of the above set of equations is demonstrated in FIGS. 3A-5 using data from a VSP survey where both DAS and geophone data were collected. FIGS. 3A-3B show a comparison of a shot gather and the corresponding simulated geophone data. A shot is an activation of a seismic source and a shot gather. A gather is a collection of seismic traces that have some geometric attribute in common. A trace is a recording in one channel of an earth response to seismic energy passing from a source through one or more formation layers to a receiver. FIG. 3A is an image of DAS shot gather collected on a DAS system from a single offset VSP survey. FIG. 3B is an image of simulated geophone gather generated from the DAS shot gather using equations (1)-(8). Datasets for these figures are individually normalized.

Figure 4:
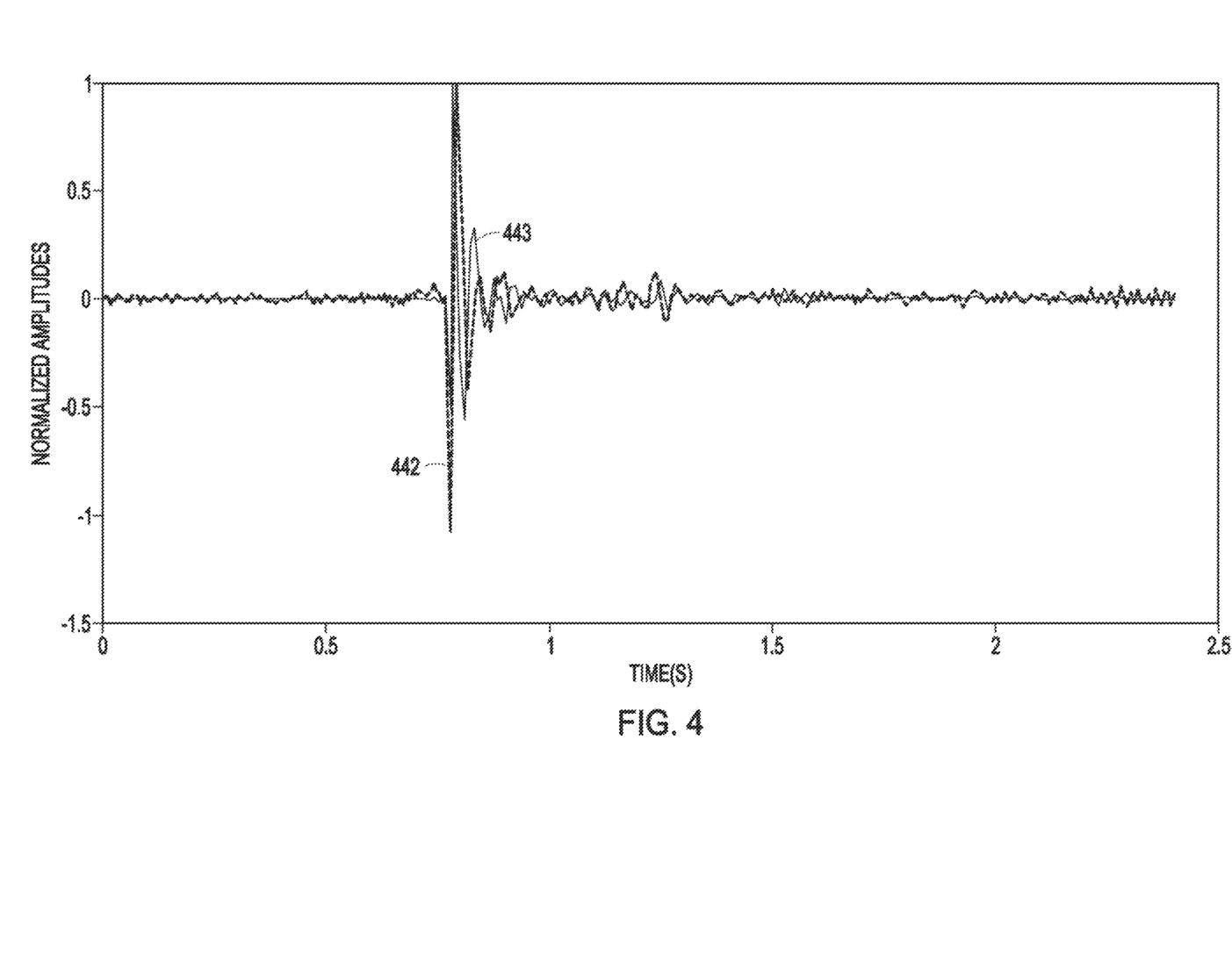
FIG. 4 is a plot of normalized amplitudes versus time, showing a trace from the distributed acoustic sensing gather in FIG. 3A compared with a true geophone trace at the corresponding depth, in accordance with various embodiments.

FIG. 4 shows a trace from the DAS gather in FIG. 3A compared with a true geophone trace at the corresponding depth. FIG. 4 provides a comparison of normalized DAS and true geophone traces at a given receiver depth. DAS data is shown in dashed curve 442 and geophone data shown in curve 443. Phase characteristics of the trace from the DAS gather are very different (phase rotation of around 120 degrees) from geophone traces, both in simulated and actual at the corresponding depth. See FIG. 5.

Figure 5:
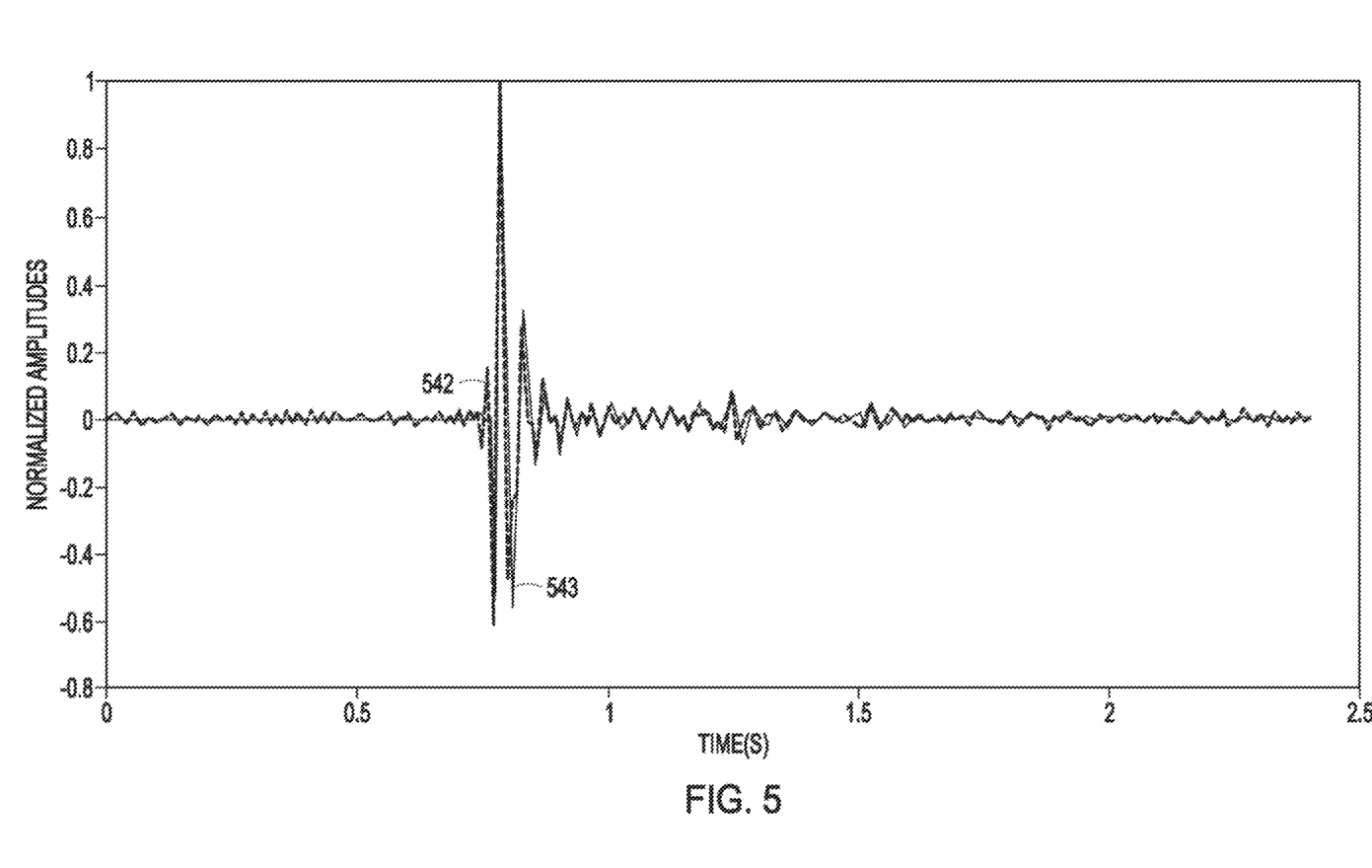
FIG. 5 is a plot of normalized amplitudes versus time, showing traces picked from simulated geophone shot gather data and actual geophone shot gather data at the same depth as the trace in FIG. 4, in accordance with various embodiments.

FIG. 5 is a comparison of normalized geophone data traces at the same depth as the DAS trace in FIG. 4. FIG. 5 shows traces picked from simulated geophone shot gather data (dashed curve 542) and actual geophone shot gather data (curve 543) at the same depth as the trace in FIG. 4. DAS and geophone data were collected at the same survey site for comparison. Similarity of the traces upon comparison after normalizing them is remarkable. This shows that the data transformation operations, as taught herein, are valid. It may be noted that this example shows data from a mid offset VSP survey. However, the equations should remain valid for non-zero offset VSP surveys as well, since there is nothing specific in the formulation for the source offset.

Other approaches to converting DAS VSP trace data into simulated geophone data includes the application of a time derivative to the DAS traces. This approach does a reasonable job of matching the geophone data. However, the approaches, as taught herein, provides an approach based more fully on physics, which may be even better at simulating geophone response.

Figure 6:
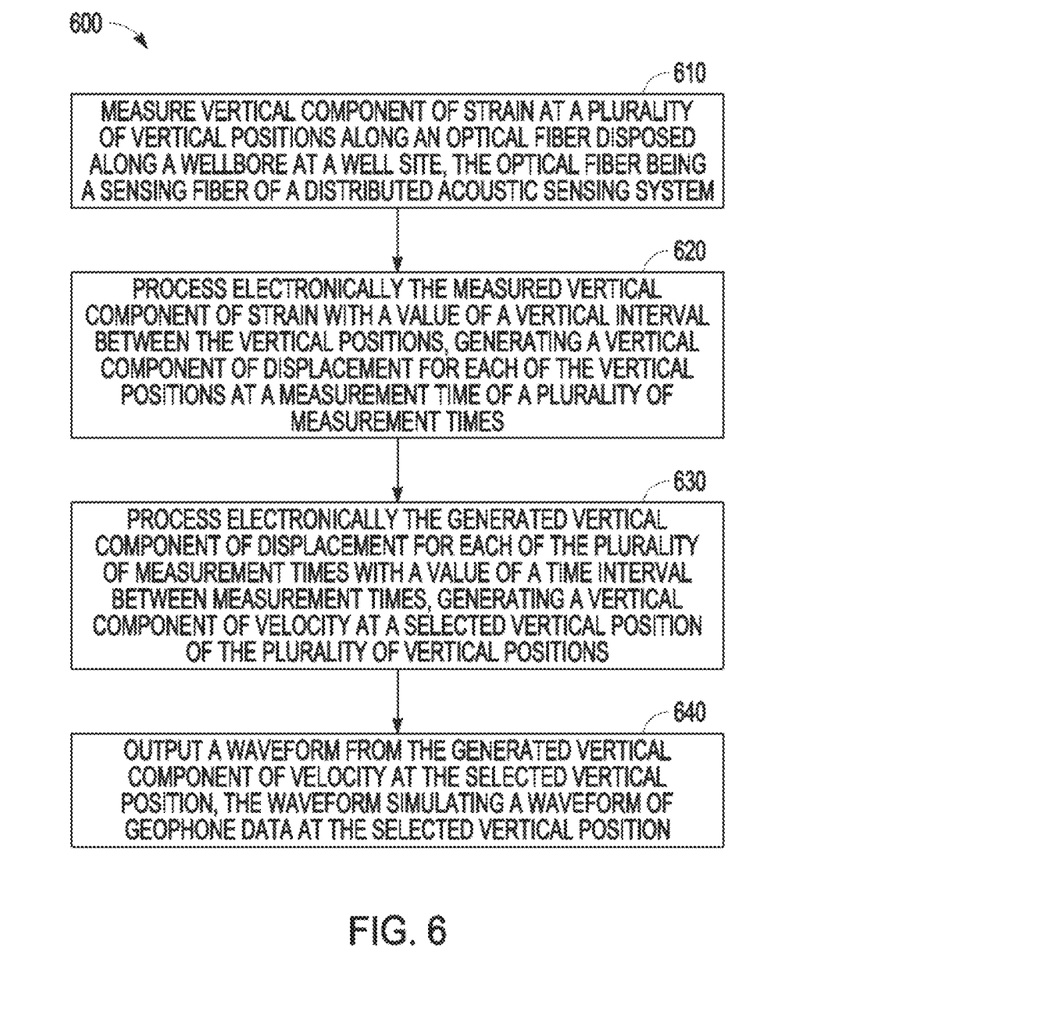
FIG. 6 is a flow diagram of features of an example method to generate geophone data from optical data, in accordance with various embodiments.

FIG. 6 is a flow diagram of features of an embodiment of an example method 600 to generate geophone data from optical data. At 610, vertical component of strain is measured at a plurality of vertical positions along an optical fiber disposed along a wellbore at a well site, the optical fiber being a sensing fiber of a distributed acoustic sensing system. At 620, the measured vertical component of strain is electronically processed with a value of a vertical interval between the vertical positions, generating a vertical component of displacement for each of the vertical positions at a measurement time of a plurality of measurement times. At 630, the generated vertical component of displacement is electronically processed for each of the plurality of measurement times with a value of a time interval between measurement times, generating a vertical component of velocity at a selected vertical position of the plurality of vertical positions. Electronically processing the measured vertical component of strain can include integrating over a domain of integration in depth, and electronically processing the generated vertical component of displacement can include differentiating the generated vertical component of displacement over time. Integrating over depth can be performed prior to differentiating over time or differentiating over time can be performed prior to integrating over depth. Method 600 or methods similar to method 600 can include generating downgoing simulated geophone data and upgoing simulated geophone data and adding the downgoing simulated geophone data and upgoing simulated geophone data to generate a total simulated geophone wavefield data to output. At 640, a waveform from the generated vertical component of velocity at the selected vertical position is output, the waveform simulating a waveform of geophone data at the selected vertical position.

Variations of method 600 or methods similar to method 600 can include a number of different embodiments that may or may not be combined depending on the application of such methods and/or the architecture of systems in which such methods are implemented. Such methods can include processing the measured vertical component of strain to increase the signal to noise ratio and remove artifacts in the measured vertical component of strain, prior to generating vertical components of displacement. Such methods can include applying a band pass frequency domain filter to the generated vertical components of displacement before generating the vertical components of velocity. Such methods can include processing the simulated waveform of geophone data by application of geophysical workflows for geophone data. Application of geophysical workflows for geophone data can include imaging a subsurface at the well site from reflected events detected by the optical fiber.

In various embodiments, a non-transitory machine-readable storage device can comprise instructions stored thereon, which, when performed by a machine, cause the machine to perform operations, the operations comprising one or more features similar to or identical to features of methods and techniques described with respect to method 600, variations thereof, and/or features of other methods taught herein such as associated with FIGS. 1-5 and 7. The physical structures of such instructions may be operated on by one or more processors. For example, executing these physical structures can cause the machine to perform operations comprising: measuring vertical component of strain at a plurality of vertical positions along an optical fiber disposed along a wellbore at a well site, the optical fiber being a sensing fiber of a distributed acoustic sensing system; electronically processing the measured vertical component of strain with a value of a vertical interval between the vertical positions, generating a vertical component of displacement for each of the vertical positions at a measurement time of a plurality of measurement times; electronically processing the generated vertical component of displacement for each of the plurality of measurement times with a value of a time interval between measurement times, generating a vertical component of velocity at a selected vertical position of the plurality of vertical positions; and outputting a waveform from the generated vertical component of velocity at the selected vertical position, the waveform simulating a waveform from geophone data at the selected vertical position.

Execution of various instructions may be realized by the control circuitry of the machine to execute one or more features similar to or identical to features of methods and techniques described with respect to method 600, variations thereof, and/or features of other methods taught herein such as associated with FIGS. 1-5. For example, the instructions can include instructions to operate a tool or tools having a laser generator and interrogator disposed with respect to an optical fiber in a wellbore to provide data to process in accordance with the teachings herein. In addition, the instructions may instructions to operate a seismic source in conjunction with operating the tool(s).

The machine-readable storage device can include different sets of instructions to perform a number of operations. The operations can include generating downgoing simulated geophone data and upgoing simulated geophone data and adding the downgoing simulated geophone data and upgoing simulated geophone data to generate a total simulated geophone wavefield data to output. The operations can include electronically processing the measured vertical component of strain to include integrating over a domain of integration in depth, and electronically processing the generated vertical component of displacement to include differentiating the generated vertical component of displacement over time. Integrating over depth can be performed prior to differentiating over time or differentiating over time can be performed prior to integrating over depth.

The sets of instructions of a machine-readable storage device, as taught herein, can include instructions to perform operations that can include processing the measured vertical component of strain to increase the signal to noise ratio and remove artifacts in the measured vertical component of strain, prior to generating vertical components of displacement. The operations can include applying a band pass frequency domain filter to the generated vertical components of displacement before generating the vertical components of velocity. The operations can include processing the simulated waveform of geophone data by application of geophysical workflows for geophone data. Application of geophysical workflows for geophone data can include imaging a subsurface at the well site from reflected events detected by the optical fiber.

Further, a machine-readable storage device, herein, is a physical device that stores data represented by physical structure within the device. Such a physical device is a non-transitory device. Examples of machine-readable storage devices can include, but are not limited to, read only memory (ROM), random access memory (RAM), a magnetic disk storage device, an optical storage device, a flash memory, and other electronic, magnetic, and/or optical memory devices. The machine-readable device may be a machine-readable medium such as memory 735 of FIG. 7. While memory 735 is shown as a single unit, terms such as "memory," "memory module," "machine-readable medium," "machine-readable device," and similar terms should be taken to include all forms of storage media, either in the form of a single medium (or device) or multiple media (or devices), in all forms. For example, such structures can be realized as centralized database(s), distributed database(s), associated caches, and servers; one or more storage devices, such as storage drives (including but not limited to electronic, magnetic, and optical drives and storage mechanisms), and one or more instances of memory devices or modules (whether main memory; cache storage, either internal or external to a processor; or buffers). Terms such as "memory," "memory module," "machine-readable medium," and "machine-readable device," shall be taken to include any tangible non-transitory medium which is capable of storing or encoding a sequence of instructions for execution by the machine and that cause the machine to perform any one of the methodologies taught herein. The term "non-transitory" used in reference to a "machine-readable device," "medium," "storage medium," "device," or "storage device" expressly includes all forms of storage drives (optical, magnetic, electrical, etc.) and all forms of memory devices (e.g., DRAM, Flash (of all storage designs), SRAM, MRAM, phase change, etc., as well as all other structures designed to store data of any type for later retrieval.

Figure 7:
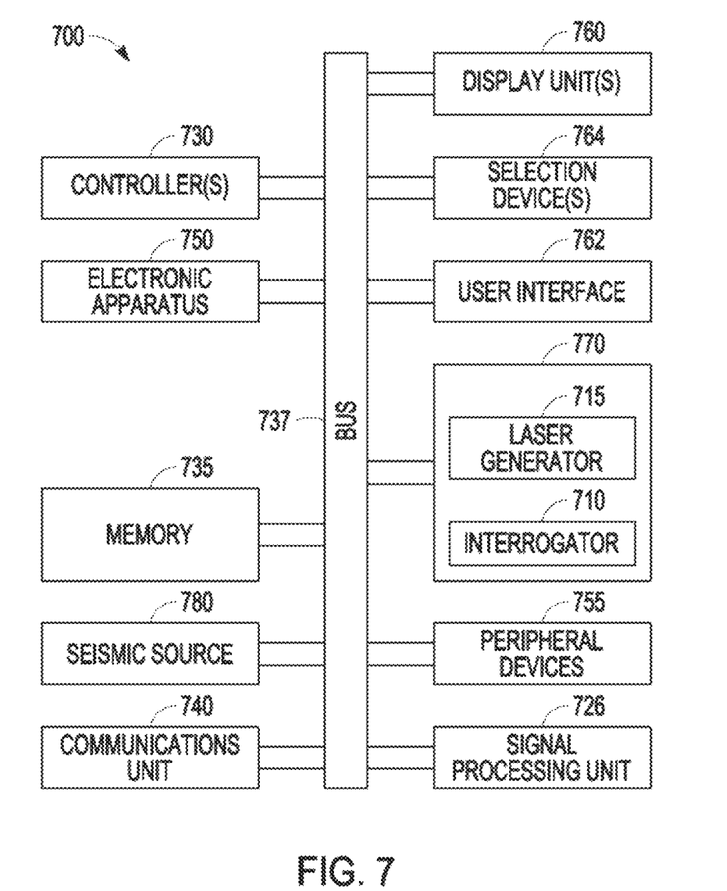
FIG. 7 is a block diagram of features of an example system operable to execute schemes associated with generating vertical component geophone waveform data from distributed acoustic sensing, in accordance with various embodiments.

FIG. 7 is a block diagram of features of an embodiment of an example system 700 operable to execute schemes associated with converting data from DAS measurements in a wellbore of a well to geophone measurements for the wellbore. The system 700 can comprise instrumentality as taught herein, for example, in accordance with embodiments described with respect to FIGS. 1 and 2 or similar arrangements and their operation as taught herein.

The system 700 can comprise a controller(s) 730 and a tool 770, where the tool 770 has one or more laser generators 715 and one or more interrogators 710. The system 700 may also include a seismic source 780 located at the seismic source at the surface near the well or in the wellbore, for example, below the optical cable for the DAS measurements. The seismic source 780 may include, but is not limited to, vibrators, explosives, air guns, and other similar sources. The controller(s) 730 can be arranged to control the one or more laser generators 715 and the one or more interrogators 710. The controller(s) 730 can be arranged to process data from optical signals received by the interrogator 710, where the optical signals are from regions of the wellbore, in response to optical signals coupled into an optical fiber by the laser generator(s) 715 with the optical fiber disposed in the wellbore generated to determine status of structures and material within the wellbore and/or the formation around the wellbore. The controller(s) 730 can be operable to process optical signals in accordance with features of features similar to or identical to features of methods and techniques described with respect to method 600, variations thereof, and/or features of other methods taught herein such as associated with FIGS. 1-6. The controller(s) 730 can be realized as one or more processors. The controller(s) 730 can be arranged as a single processor or a group of processors. Processors of the group of processors may operate independently depending on an assigned function. The controller(s) 730 can be realized as one or more application-specific integrated circuits (ASICs). The controller(s) 730 can be realized as control circuitry to manage the components of system 700.

The interrogator 710 can be realized by different optical sensors and/or optical processing devices. For example, the interrogator can include one of more interferometric systems. The laser generator(s) 715 can include one or more lasers. The one or more lasers may be operable at selected laser frequencies.

The system 700 can include a user interface 762 operable with the controller(s) 730, a signal processing unit 726 operable with the user interface 762, where the controller(s) 730, the user interface 762, and the signal processing unit 726 can be structured to be operated according to any scheme similar to or identical to the schemes associated with simulating vertical component geophone waveform data using DAS collected waveforms in a VSP survey or otherwise converting data from DAS measurements in a wellbore of a well to geophone measurements for the wellbore as taught herein. The system 700 can be arranged as a distributed system.

The system 700 can include a memory 735, an electronic apparatus 750, and a communications unit 740. The controller(s) 730, the memory 735, and the communications unit 740 can be arranged to operate as a signal processing unit to control investigation of a wellbore, pipe structure in the wellbore, material in the wellbore, and formation around the wellbore. The memory 735 can be realized as a memory module, which may include a set of memory devices and access devices to interface with the set of memory devices. The memory 735 can include a database having information and other data such that the system 700 can operate on data to control the laser generator(s) 715 and the interrogator 710. In an embodiment, the signal processing unit 726 can be distributed among the components of the system 700 including memory 735 and/or the electronic apparatus 750. Alternatively, the signal processing unit 726 can be arranged as an independent system having its own processor(s) and memory. The electronic apparatus 750 can include drivers to provide voltage and/or current input to components of the system 700. For example, the electronic apparatus 750 can include drivers of optical sources, such as lasers and can include electronic circuitry for optical detectors and interferometric devices associated with optical fiber receiver arrangements of a DAS system.

The communications unit 740 may use combinations of wired communication technologies and wireless technologies at appropriate frequencies. The communications unit 740 can allow for a portion or all of data analysis from the simulated geophone data regarding the status of the wellbore and operations associated with the wellbore to be provided to the user interface 762 for presentation on the one or more display unit(s) 760 aboveground. The communications unit 740 can allow for transmission of commands to downhole components in response to signals provided by a user through the user interface 762.

The system 700 can also include a bus 737, where the bus 737 provides electrical conductivity among the components of the system 700. The bus 737 can include an address bus, a data bus, and a control bus, each independently configured. The bus 737 can be realized using a number of different communication mediums that allows for the distribution of components of the system 700. Use of the bus 737 can be regulated by the controller(s) 730. The bus 737 can include a communications network to transmit and receive signals including data signals and command and control signals. In a distributed architecture, the bus 737 may be part of a communications network.

In various embodiments, peripheral devices 755 can include additional storage memory and/or other control devices that may operate in conjunction with the controllers(s) 730 and/or the memory 735. The display unit(s) 760 can be arranged with a screen display as a distributed component that can be used with instructions stored in the memory 735 to implement the user interface 762 to manage the operation of the tool 770 and/or components distributed within the system 700. Such a user interface can be operated in conjunction with the communications unit 740 and the bus 737. The display unit(s) 760 can include a video screen, a printing device, or other structure to visually project data/information and images. The system 700 can include a number of selection devices 764 operable with the user interface 762 to provide user inputs to operate the signal processing unit 726 or its equivalent. The selection device(s) 764 can include one or more of a touch screen, a computer mouse, or other control device operable with the user interface 762 to provide user inputs to operate the signal processing unit 726 or other components of the system 700.

In various embodiments, systems and methods can be implemented with respect to DAS measurements using physics based relationships to convert DAS data to geophone data. Such systems and method provide an alternative compared to approaches that use a signal processing based method such as time derivative based methods. Such signal processing method does not use any spatial integration in the operations for conversion. In addition, the systems and methods, as taught herein, can make DAS datasets more interpretable for geoscientists who are accustomed to geophone datasets. Hence, such systems and methods can potentially make DAS based services more appealing to a wider community of geoscientists. The geophone data generated, as taught herein, can be used to image subsurface regions and perform analysis of the wellbore and its surrounding formations. Analysis from such geophone data can be used to control drilling operations, mitigate defects or other problems detected with production strings in the wellbore, and perform other similar activities associated with the wellbore.

The following are example embodiments of methods, machine readable storage devices, and systems, in accordance with the teachings herein.

A method 1 can comprise: measuring vertical component of strain at a plurality of vertical positions along an optical fiber disposed along a wellbore at a well site, the optical fiber being a sensing fiber of a distributed acoustic sensing system; electronically processing the measured vertical component of strain with a value of a vertical interval between the vertical positions, generating a vertical component of displacement for each of the vertical positions at a measurement time of a plurality of measurement times; electronically processing the generated vertical component of displacement for each of the plurality of measurement times with a value of a time interval between measurement times, generating a vertical component of velocity at a selected vertical position of the plurality of vertical positions; and outputting a waveform from the generated vertical component of velocity at the selected vertical position, the waveform simulating a waveform of geophone data at the selected vertical position.

A method 2 can include elements of method 1 and can include generating downgoing simulated geophone data and upgoing simulated geophone data and adding the downgoing simulated geophone data and upgoing simulated geophone data to generate a total simulated geophone wavefield data to output.

A method 3 can include elements of any of methods 1 and 2 and can include electronically processing the measured vertical component of strain to include integrating over a domain of integration in depth, and electronically processing the generated vertical component of displacement to include differentiating the generated vertical component of displacement over time.

The method 4 can include elements of method 3 and elements of any of methods 1 and 2 and can include integrating over depth being performed prior to differentiating over time or differentiating over time being performed prior to integrating over depth.

A method 5 can include elements of any of methods 1-4 and can include processing the measured vertical component of strain to increase signal to noise ratio and remove artifacts in the measured vertical component of strain, prior to generating vertical components of displacement A method 6 can include elements of any of methods 1-5 and can include applying a band pass frequency domain filter to the generated vertical components of displacement before generating the vertical components of velocity.

A method 7 can include elements of any of methods 1-6 and can include processing the simulated waveform of geophone data by application of geophysical workflows for geophone data.

A method 8 can include elements of method 7 and elements of any of methods 1-6 and can include application of geophysical workflows for geophone data to include imaging a subsurface at the well site from reflected events detected by the optical fiber.

A machine-readable storage device 1 having instructions stored thereon, which, when executed by the control circuitry of a machine, can cause the machine to perform operations, the operations can comprise: measuring vertical component of strain at a plurality of vertical positions along an optical fiber disposed along a wellbore at a well site, the optical fiber being a sensing fiber of a distributed acoustic sensing system; electronically processing the measured vertical component of strain with a value of a vertical interval between the vertical positions, generating a vertical component of displacement for each of the vertical positions at a measurement time of a plurality of measurement times; electronically processing the generated vertical component of displacement for each of the plurality of measurement times with a value of a time interval between measurement times, generating a vertical component of velocity at a selected vertical position of the plurality of vertical positions; and outputting a waveform from the generated vertical component of velocity at the selected vertical position, the waveform simulating a waveform from geophone data at the selected vertical position.

A machine-readable storage device 2 can include elements of machine-readable storage device 1 and can include the operations to include generating downgoing simulated geophone data and upgoing simulated geophone data and adding the downgoing simulated geophone data and upgoing simulated geophone data to generate a total simulated geophone wavefield data to output.

A machine-readable storage device 3 can include elements of any of machine-readable storage devices 1 and 2 and can include the operations to include electronically processing the measured vertical component of strain to include integrating over a domain of integration in depth, and electronically processing the generated vertical component of displacement to include differentiating the generated vertical component of displacement over time A machine-readable storage device 4 can include elements of any of machine-readable storage devices 1-3 and can include integrating over depth being performed prior to differentiating over time or differentiating over time being performed prior to integrating over depth.

A machine-readable storage device 5 can include elements of any of machine-readable storage devices 1-5 and can include the operations to include processing the measured vertical component of strain to increase signal to noise ratio and remove artifacts in the measured vertical component of strain, prior to generating vertical components of displacement A machine-readable storage device 6 can include elements of any of machine-readable storage devices 1-5 and can include the operations to include applying a band pass frequency domain filter to the generated vertical components of displacement before generating the vertical components of velocity.

A machine-readable storage device 7 can include elements of any of machine-readable storage devices 1-6 and can include operations processing the simulated waveform of geophone data by application of geophysical workflows for geophone data.

A machine-readable storage device 8 can include elements of machine-readable storage device 7 and elements of any of machine-readable storage devices 1-6 and can include application of geophysical workflows for geophone data to include imaging a subsurface at the well site from reflected events detected by the optical fiber.

A system 1 can comprise: an optical fiber disposed along a wellbore at a well site; an interrogator operatively coupled to the optical fiber with the optical fiber arranged as a sensing fiber of a distributed acoustic sensing system, the interrogator including an optical source to inject light into the optical fiber and a receiver to detect light from the optical fiber; a processor operatively coupled to the interrogator, the processor is arranged to process the detected light to measure vertical component of strain at a plurality of vertical positions along the optical fiber disposed along the wellbore, to electronically process the measured vertical components of strain with a value of a vertical interval between the vertical positions such that a vertical component of displacement is generated for each of the vertical positions at a measurement time of a plurality of measurement times, to electronically process the generated vertical component of displacement for each of the plurality of measurement times with a value of a time interval between measurement times such that a vertical component of velocity is generated at a selected vertical position of the plurality of vertical positions, and to output a waveform from the generated vertical component of velocity at the selected vertical position, wherein the waveform simulates a waveform from geophone data at the selected vertical position.

A system 2 can include elements of system 1 and can include the processor arranged to generate downgoing simulated geophone data and upgoing simulated geophone data and to add the downgoing simulated geophone data and upgoing simulated geophone data to generate a total simulated geophone wavefield data to output.

A system 3 can include elements of any of systems 1 and 2 and can include the processor electronically processing the measured vertical component of strain to include integrating over a domain of integration in depth, and electronically processing the generated vertical component of displacement to include differentiating the generated vertical component of displacement over time.

A system 4 can include elements of any of systems 1-3 and can include integration over depth being performed prior to differentiation over time or differentiation over time being performed prior to integration over depth.

A system 5 can include elements of any of systems 1-4 and can include the processor arranged to process the measured vertical component of strain to increase signal to noise ratio and remove artifacts in the measured vertical component of strain, prior to generation of the vertical components of displacement.

A system 6 can include elements of any of systems 1-5 and can include the processor arranged to apply a band pass frequency domain filter to the generated vertical components of displacement before generating the vertical components of velocity.

A system 7 can include elements of any of systems 1-6 and can include a source to impart seismic energy into regions around the wellbore.

A system 8 can include elements of any of systems 1-7 and can include a display to present an image of a subsurface from reflected events detected by the optical fiber and interrogator, the image generated from the simulated waveform of geophone data by application of geophysical workflows for geophone data.

Although specific embodiments have been illustrated and described herein, it will be appreciated by those of ordinary skill in the art that any arrangement that is calculated to achieve the same purpose may be substituted for the specific embodiments shown. Various embodiments use permutations and/or combinations of embodiments described herein. It is to be understood that the above description is intended to be illustrative, and not restrictive, and that the phraseology or terminology employed herein is for the purpose of description. Combinations of the above embodiments and other embodiments will be apparent to those of skill in the art upon studying the above description.

What is claimed is:

1. A method comprising:
    performing fiber optic measurements using a distributed fiber optic arranging to obtain strain measurement data at a plurality of vertical positions along an optical fiber disposed along a wellbore at a well site, the optical fiber being a sensing fiber of the distributed acoustic sensing system, the strain measurement data being comprised of up and down going wavefields;
    separating up and down going wavefields of the strain measurement data;
    electronically processing the up and down going wavefields to obtain a vertical component of displacement that corresponds to each vertical interval between the strain measurement data, the electronic processing comprising application of difference equations having variables which correspond to depth intervals for the up and down going wavefields, the difference equations being discretized versions of governing differential equations;
    electronically processing each vertical component of displacement to generate a vertical component of velocity; and
    outputting a waveform from the generated vertical component of velocity that corresponds to each vertical position along the optical fiber, the outputted waveform simulating a geophone data waveform at the vertical position,
    wherein the separated up and down going wavefields of the strain measurement data are optionally recombined before the simulated geophone data waveform is output.

2. The method of claim 1, wherein the recombination includes generating downgoing simulated geophone data and upgoing simulated geophone data and adding the downgoing simulated geophone data and upgoing simulated geophone data to generate a total simulated geophone wavefield data to output.

3. The method of claim 1, wherein electronically processing the up and down going wavefields includes integrating over a domain of integration in depth, and electronically processing the generated vertical component of displacement includes differentiating the generated vertical component of displacement over time.

4. The method of claim 1, wherein the method includes processing the strain measurement data to increase the signal to noise ratio and remove artifacts in the measured vertical component of strain, prior to generating vertical components of displacement.

5. The method of claim 1, wherein the method includes applying a band pass frequency domain filter to the generated vertical components of displacement before generating the vertical components of velocity.

6. The method of claim 1, wherein the method includes processing the simulated waveform of geophone data by application of geophysical workflows for geophone data.

7. The method of claim 6, wherein application of geophysical workflows for geophone data includes imaging a subsurface at the well site from reflected events detected by the optical fiber.

8. A machine-readable storage device having instructions stored thereon, which, when executed by the control circuitry of a machine, cause the machine to perform operations, the operations comprising:
    performing fiber optic measurements using a distributed fiber optic arranging to obtain strain measurement data at a plurality of vertical positions along an optical fiber disposed along a wellbore at a well site, the optical fiber being a sensing fiber of the distributed acoustic sensing system, the strain measurement data being comprised of up and down going wavefields;
    separating up and down going wavefields of the strain measurement data;

electronically processing the up and down going wavefields to obtain a vertical component of displacement that corresponds to each vertical interval between the strain measurement data, the electronic processing comprising application of difference equations having variables which correspond to depth intervals for the up and down going wavefields, the difference equations being discretized versions of governing differential equations;

electronically processing each vertical component of displacement to generate a vertical component of velocity; and outputting a waveform from the generated vertical component of velocity that corresponds to each vertical position along the optical fiber, the outputted waveform simulating a geophone data waveform at the vertical position, wherein the separated up and down going wavefields of the strain measurement data are optionally recombined before the simulated geophone data waveform is output.

9. The machine-readable storage device of claim 8, wherein the recombination includes generating downgoing simulated geophone data and upgoing simulated geophone data and adding the downgoing simulated geophone data and upgoing simulated geophone data to generate a total simulated geophone wavefield data to output.

10. The machine-readable storage device of claim 8, wherein electronically processing the strain measurement data includes integrating over a domain of integration in depth, and electronically processing the generated vertical component of displacement includes differentiating the generated vertical component of displacement over time.

11. The machine-readable storage device of claim 8, wherein the operations include processing the strain measurement data to increase the signal to noise ratio and remove artifacts in the measured vertical component of strain, prior to generating vertical components of displacement.

12. The machine-readable storage device of claim 8, wherein the operations include applying a band pass frequency domain filter to the generated vertical components of displacement before generating the vertical components of velocity.

13. The machine-readable storage device of claim 8, wherein the operations include processing the simulated waveform of geophone data by application of geophysical workflows for geophone data, which includes imaging a subsurface at the well site from reflected events detected by the optical fiber.

14. A system comprising:
an optical fiber disposed along a wellbore at a well site;
an interrogator operatively coupled to the optical fiber with the optical fiber arranged as a sensing fiber of a distributed acoustic sensing system, the interrogator including an optical source to inject light into the optical fiber and a receiver to detect light from the optical fiber;
a processor operatively coupled to the interrogator, the processor is arranged to process the detected light to:

obtain strain measurements data at a plurality of vertical positions along the optical fiber, the strain measurements data being comprised of up and down going wavefields;

separate up and down going wavefields of the strain measurements data;

electronically processes the up and down going wavefields to obtain a vertical component of displacement that corresponds to each vertical interval between the strain measurements data, the electronic processing comprising application of difference equations having variables which correspond to depth intervals for the up and down going wavefields, the difference equations being discretized versions of governing differential equations;

electronically process each vertical component of displacement to generate a vertical component of velocity; and output a waveform from the generated vertical component of velocity that corresponds to each vertical position along the optical fiber, the outputted waveform simulating a geophone data waveform at the vertical position, wherein the separated up and down going wavefields of the strain measurements data are optionally recombined before the simulated geophone data waveform is output.

15. The system of claim 14, wherein the processor is arranged to generate downgoing simulated geophone data and upgoing simulated geophone data and to add the downgoing simulated geophone data and upgoing simulated geophone data to generate a total simulated geophone wavefield data to output.

16. The system of claim 14, wherein the processor electronically processing the strain measurement data includes integrating over a domain of integration in depth, and electronically processing the generated vertical component of displacement includes differentiating the generated vertical component of displacement over time.

17. The system of claim 14, wherein the processor is arranged to process the strain measurement data to increase the signal to noise ratio and remove artifacts in the measured vertical component of strain, prior to generation of the vertical components of displacement.

18. The system of claim 14, wherein the processor is arranged to apply a band pass frequency domain filter to the generated vertical components of displacement before generating the vertical components of velocity.

19. The system of claim 14, wherein the system includes a source to impart seismic energy into regions around the wellbore.

20. The system of claim 14, wherein the system includes a display to present an image of a subsurface from reflected events detected by the optical fiber and interrogator, the image generated from the simulated waveform of geophone data by application of geophysical workflows for geophone data.

* * * * *